(12) United States Patent
Szilagyi et al.

(10) Patent No.: US 6,764,222 B1
(45) Date of Patent: Jul. 20, 2004

(54) FIBER OPTIC CONNECTOR ASSEMBLY

(75) Inventors: B. Daniel Szilagyi, Naperville, IL (US); Scot A. Ernst, Plainfield, IL (US); Igor Grois, Northbrook, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/345,584

(22) Filed: Jan. 16, 2003

(51) Int. Cl.⁷ ................................................. G02B 6/38
(52) U.S. Cl. ..................... 385/55; 439/138; 439/680; 439/378
(58) Field of Search ......................... 385/55, 53, 60, 385/73, 75–78, 139, 88, 92; 439/138, 680, 378

(56) References Cited

U.S. PATENT DOCUMENTS 6,069,992 A * 5/2000 Hyzin ........................ 385/55
6,116,789 A * 9/2000 Mrakovich et al. ........... 385/59

* cited by examiner

Primary Examiner—Javaid H. Nasri
(74) Attorney, Agent, or Firm—Romi N. Bose

(57) ABSTRACT

A fiber optic connector assembly includes a receptacle for receiving a fiber optic connector along an optic axis. A housing has an open end for receiving the fiber optic connector. A pair of shutter members are pivotally mounted on the housing at opposite sides of the open end for pivotal movement toward and away from each other to close and open the open end. One of the shutter members is shorter than the other shutter member so that the one shutter member closes before the other shutter member and, thereby, prevents binding therebetween. The receptacle has a bottom mating face, and the fiber optic connector has a plurality of alignment pins insertable into guide holes in the mating face. The fiber optic connector assembly include particular dimensional relationships to prevent the alignment pins from engaging the mating face rather than entering the guide holes.

8 Claims, 5 Drawing Sheets

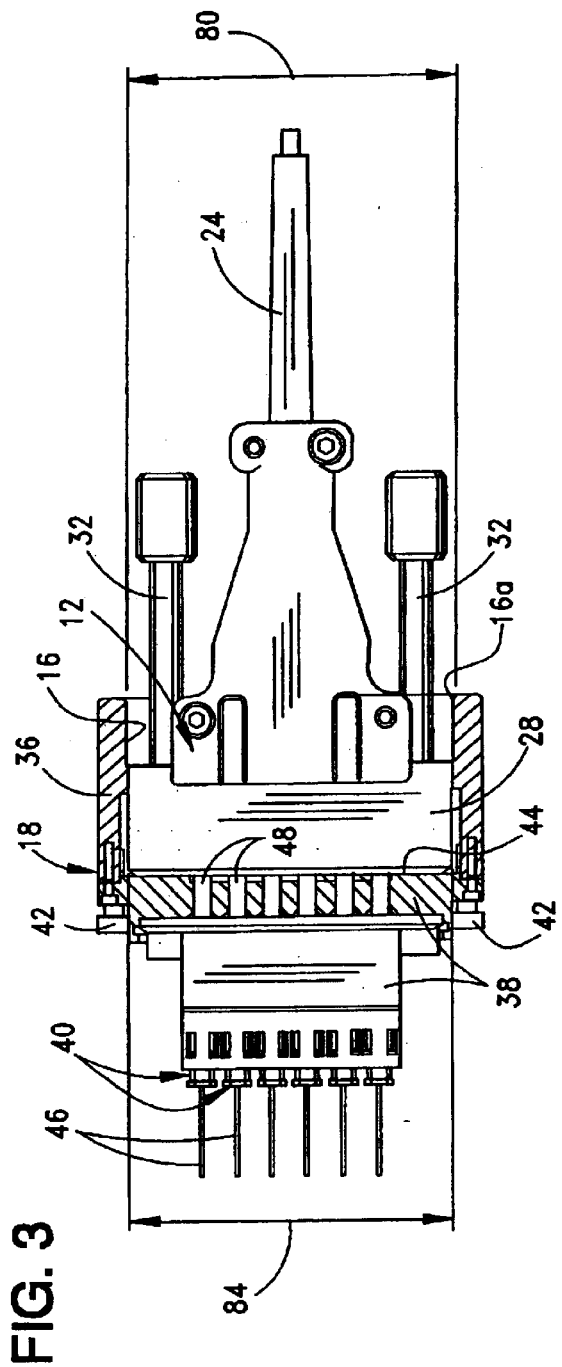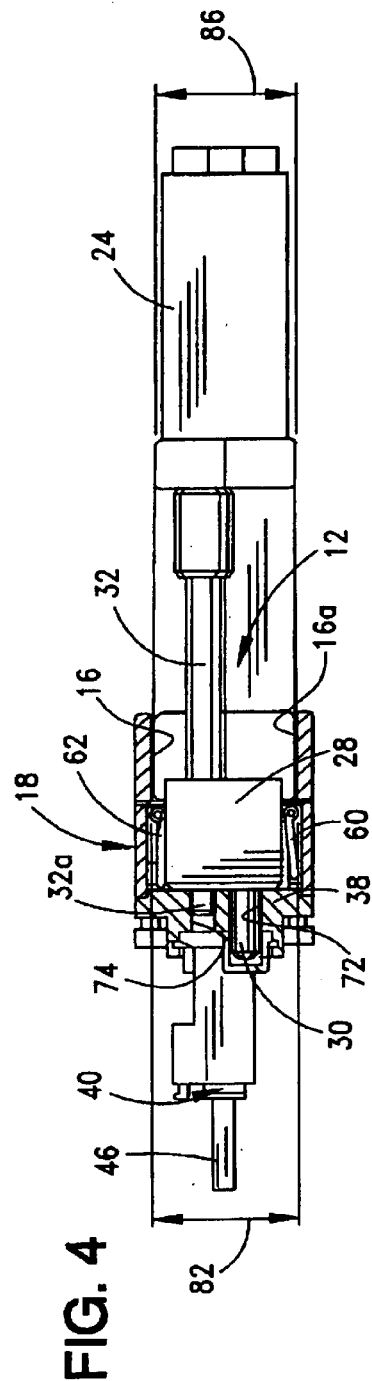
FIG. 3
FIG. 4

FIBER OPTIC CONNECTOR ASSEMBLY

FIELD OF THE INVENTION

This invention generally relates to the art of fiber optic connectors and, particularly, to a fiber optic connector which includes a pair of shutter members, and a connector assembly which is particularly dimensioned to prevent alignment pins of one connector from damaging an internal mating face of a second connector.

BACKGROUND OF THE INVENTION

Fiber optic connectors of a wide variety of designs have been employed to terminate optical fiber cables and to facilitate connection of the cables to other cables or other optical fiber transmission devices. A typical optic fiber connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A plurality of fiber optic connectors often are mated in an adapter with another connector or connectors, with the adapter aligning the fibers to provide low insertion losses. The adapter couples the mating connectors together so that their encapsulated fibers connect end-to-end. The adapter may be an in-line component, or the adapter can be designed for mounting in an opening in a panel, backplane, circuit board or the like.

Various problems are encountered when terminating optical fibers in fiber optic connectors versus terminating electrical conductors in electrical connectors, when situations arise wherein a fiber end of an "active" fiber optic connector is exposed. A typical situation might arise when one of the fiber optic connectors at one end of an adapter is removed, leaving the other "active" fiber optic connector or connectors in the adapter.

In particular, an exposed fiber end may be damaged by adverse environmental hazards, and the accumulation of dust and dirt may impair the optical transmission capabilities of the fiber. Another very important problem is to protect an operator's eyes from dangerous light beams from the exposed-end of an active optical fiber. For instance, an operator's eyes may be damaged from dangerous light beams exiting an unprotected receptacle or adapter.

Heretofore, dust covers, end caps or spring-loaded shutter members have been used to close an open end of an adapter to, thereby, cover the exposed fiber ends to protect the fiber ends from adverse environmental hazards and to prevent light energy from the fiber ends from exiting the adapter. One such spring-loaded shutter member is pivotally mounted on the adapter adjacent the open end thereof and is pivotally movable to close and open the open end. The shutter member extends across the optic axis of the connector/adapter assembly when the shutter member is closed. The shutter member may be pivotable away from the optic axis to its open condition.

In some connector assemblies, a pair of opposing shutter members are used, versus a single shutter member. The pair of shutter members are pivotally mounted at opposite sides of the connector receptacle, and the use of a pair of opposing shutter doors has a number of advantages. First, the two shutter members save considerable axial space which otherwise would be required to accommodate the full pivoting action of a single shutter member which would be approximately twice the size of a pair of shutter members. Second, it is easier to open the two smaller shutter members because smaller springs can be provided. When a mating connector has alignment pins, the pins generally are at the center of the connector and, thereby, most forces are applied near the edges of the pair of shutter members, whereas with a single shutter member a large force is required on one side of the centerline than the other side. Third, the wiping surface of either of the pair of shutter members is one-half the wiping surface of a single shutter member. With the single shutter member, dust collected on the outside of the shutter member is carried all the way into the interface area between the connectors. With a pair of shutter members, any dust which accumulates on the outer surfaces thereof will be deposited away from the mating interface rather than being carried further inwardly.

However, the use of a pair of opposing shutter members continue to create problems in being able to completely close an open end of a receptacle without causing binding between the shutter members. The present invention is directed to solving this problem by a simple arrangement whereby one shutter member is shorter than the other shutter member and, thereby, the shorter shutter member closes before the longer shutter member and there can be no binding.

The invention herein is directed to solving other problems in mating such fiber optic connectors by providing specific dimensional relationships between a receptacle and a plug of a connector assembly to prevent alignment pins on the plug from damaging the mating interface within the receptacle.

SUMMARY OF THE INVENTION

An object, therefore, of the invention is to provide a new and improved fiber optic connector assembly of the character described.

According to one aspect of the invention, a connector receptacle is provided for receiving a fiber optic connector along an optic axis. The receptacle includes a housing having an open end for receiving the fiber optic connector inserted thereinto on the optic axis. A pair of shutter members are pivotally mounted on the housing at opposite sides of the open end for pivotal movement toward and away from each other toward and away from the optic axis to close and open the open end. One of the shutter members is shorter than the other shutter member in a direction radially of the axis so that the one shutter member closes before the other shutter member and, thereby, prevents binding therebetween.

In the exemplary embodiment of the invention, the shutter members are generally planar and rectangular for closing a generally rectangular open end of the housing. An inner edge of the longer shutter member overlaps an inner edge of the shorter shutter member when the shutter members are closed. A spring is operatively associated between each shutter member and the housing to bias the respective shutter member toward its closed positions. The springs have generally equal spring constants to apply a generally equal spring force on each shutter member.

According to another aspect of the invention, a fiber optic connector assembly includes a first connector having a housing with a receptacle defining an optic axis. A bottom of the receptacle defines a mating face with a pair of transversely spaced pin-receiving guide holes. A second connector includes a housing forming a plug insertable into the receptacle of the first connector on the optic axis. The second connector has a pair of transversely spaced alignment pins projecting axially from the plug for insertion into the guide holes in the mating face at the bottom of the receptacle of the first connector. The plug and the receptacle have respective cross-dimensions such as to provide a sufficiently close fit, and the receptacle is of sufficient depth in relation to the length of the plug and the projecting alignment pins, to prevent the alignment-pins from engaging the mating face at the bottom of the receptacle rather than entering the guide holes in the mating face.

According to still another aspect of the invention, an elongated guide rib is provided on one of the outside of the plug of the second connector or the inside of the receptacle of the first connector, insertable into an elongated groove in the other of the outside of the plug or the inside of the receptacle when the plug is inserted into the receptacle. The rib and the groove extend generally parallel to the optic axis. The rib has a sufficiently close fit in the groove, and the rib and groove have sufficient lengths in relation to the length of the alignment pins, to prevent the alignment pins from engaging the mating face at the bottom of the receptacle rather than entering the guide holes in the mating face.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 3 is a horizontal section through the assembly as viewed in FIG. 2;

FIG. 4 is a vertical section through the assembly as viewed in FIG. 2;

DETAILED DESCRIPTION OF THE PREFERRED EMBODIMENT

Figure 1:
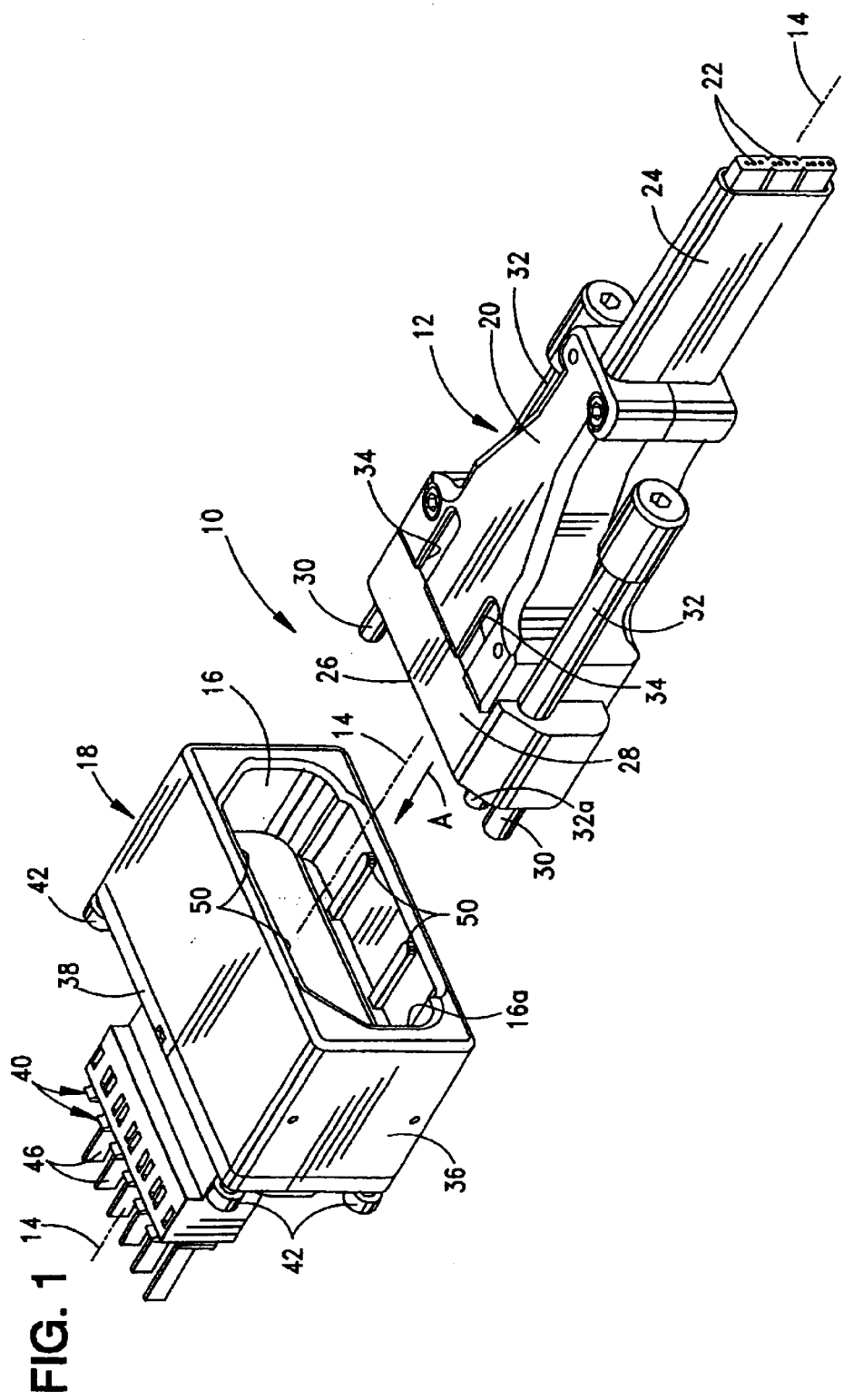
FIG. 1 is perspective view of a fiber optic connector assembly according to the invention, in unmated condition.
Figure 2:
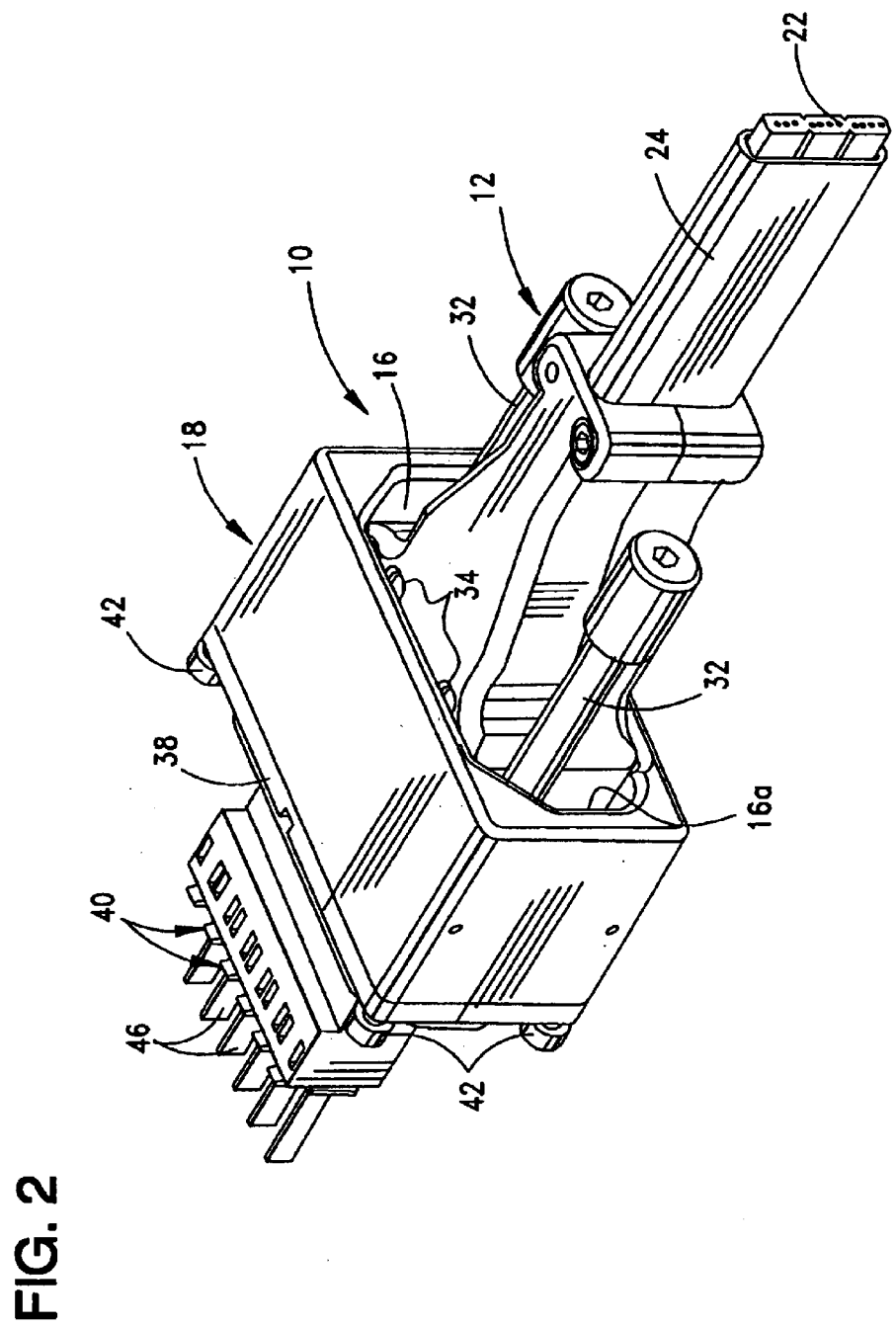
FIG. 2 is a perspective view of the assembly in mated condition.

Referring to the drawings in greater detail, and first to FIGS. 1 and 2, the invention is embodied in a fiber optic connector assembly, generally designated 10, which includes a plug connector, generally designated 12, insertable on an optic axis 14 into a receptacle 16 of an adapter assembly, generally designated 18. FIG. 1 shows the plug-connector and the adapter assembly in unmated condition. The plug connector is inserted in the direction of arrow "A" (FIG. 1) into an open end 16a of receptacle 16 of adapter assembly 18 to a mated condition shown in FIG. 2.

Plug connector 12 includes a housing 20 which mounts one or more ferrules (not visible in the drawings) that terminate the individual optical fibers 22 of a large fiber optic cable or ribbon 24. As is known in the art, the individual fibers are exposed at a front mating face 26 of a plug 28 of plug connector 12, the plug being insertable into open end 16a of receptacle 16 of adapter assembly 18. A pair of transversely spaced alignment pins 30 project A forwardly of mating face 26. Housing 20 also journals a pair of transversely spaced jack screws 32 for free rotation relative to the housing, the jack screws having externally threaded distal ends 32a projecting forwardly of mating face 26. A pair of transversely spaced, forwardly opening guide grooves 34 are formed in each of the top and bottom of housing 20. For purposes to be described in greater detail hereinafter, each guide groove is 12.5 mm long and 3.0 mm wide.

Referring to FIGS. 3 and 4 in conjunction with FIGS. 1 and 2, adapter assembly 18 has a housing which basically includes two parts, namely a front housing part 36 which defines receptacle 16 and a rear housing part 38 which receives a plurality of terminal modules, generally designated 40. Rear housing part 38 is connected to front housing part 36 by a plurality of fasteners 42. The rear housing part defines a mating face 44 at the bottom of receptacle 16. Each terminal module terminates a separate, small fiber optic cable or ribbon 46. The individual fibers of each cable or ribbon are terminated in respective ferrules 48 of terminal modules 40. The ferrules have mating faces which are generally flush with mating face 44. As best seen in FIG. 1, a pair of guide ribs 50 project inwardly from opposite sides of receptacle 16 for insertion into guide grooves 34 on the top and bottom of plug connector 10. Receptacle 16 of adapter assembly 18, and plug 28 of plug connector 12, are rectangular in configuration defining major sides extending horizontally in FIGS. 1 and 2 and as represented by the section direction of FIG. 3, along with minor sides extending in the vertical direction in FIGS. 1 and 2 and as represented by the section direction of FIG. 4. Guide ribs 50 and guide grooves 34 are transversely spaced on the major sides of this rectangular configuration. Each guide rib is approximately 2.0 mm wide and substantially the same length as guide grooves 34.

Figure 5:
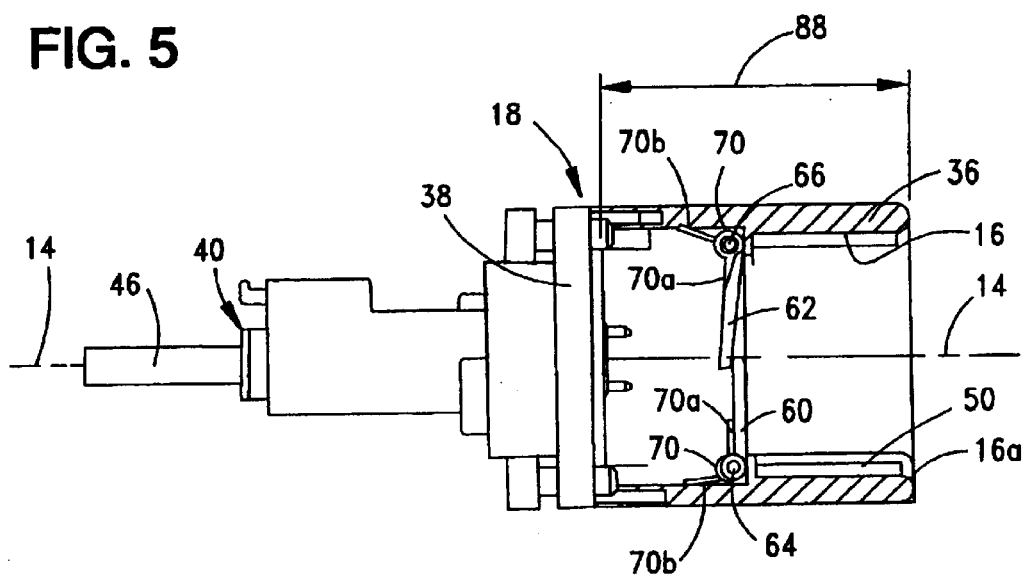
FIG. 5 is an enlarged side elevational view of the adapter assembly, partially in vertical section to show the shutter members in closed condition.
Figures 7, 8:
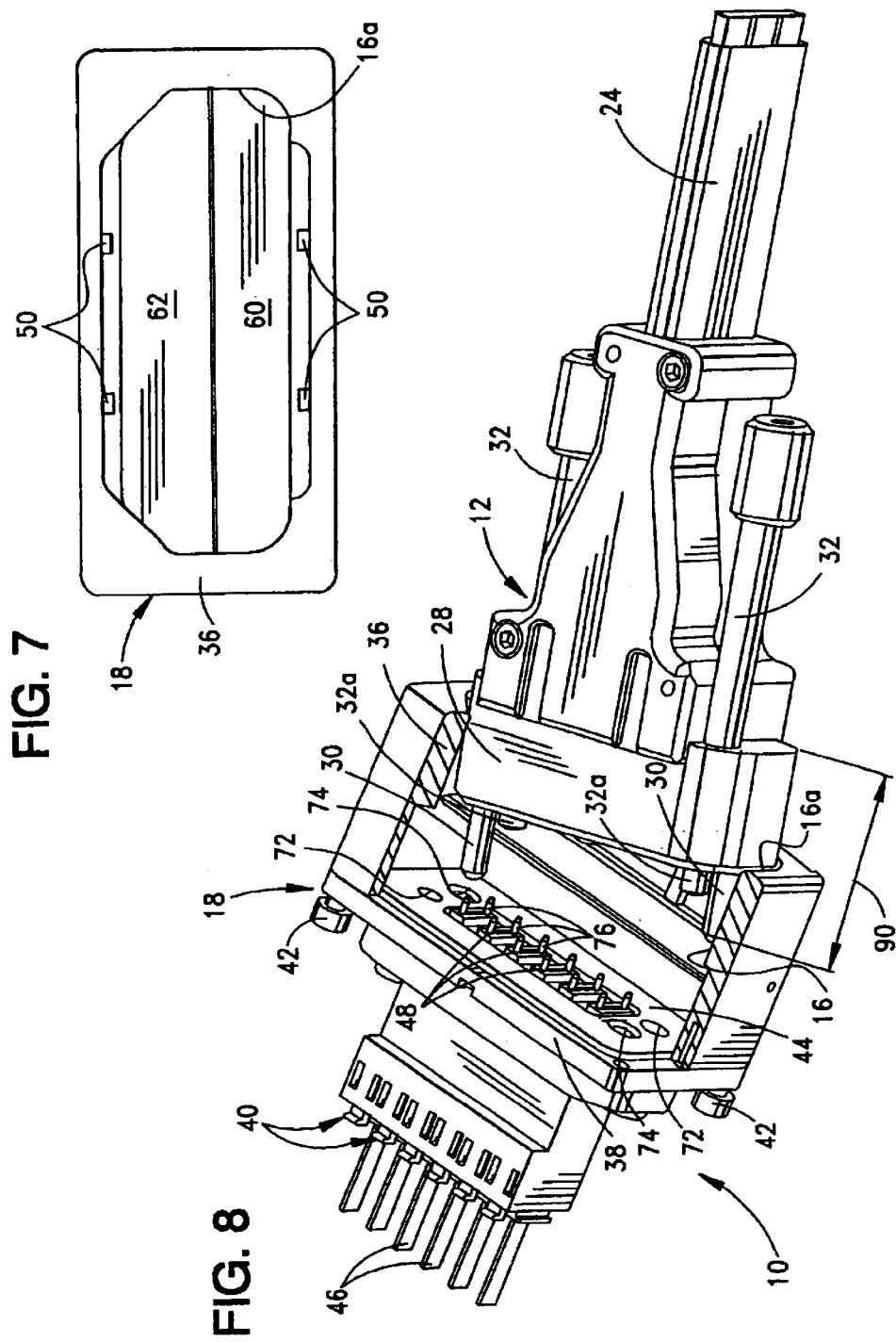
FIG. 7 is an end elevational view looking toward the right-hand end of the adapter assembly shown in FIGS. 5 and 6.
FIG. 8 is a perspective view of the connector assembly of FIGS. 1 and 2, with the adapter assembly cut-away to show the condition when an attempt is made to insert the plug connector at an angle or skewed orientation.

FIG. 5 shows a feature of the invention which comprises a pair of shutter members or doors 60 and 62 which are pivoted at 64 and 66, respectively. The shutter members are pivotally mounted on opposite major sides of adapter assembly 18 within receptacle 16. The shutter members are pivotally movable toward and away from each other and toward and away from optic axis 14 to close and open end 16a of receptacle 16. FIGS. 5 and 7 show the shutter members in their closed condition. FIG. 4 shows the shutter members in their open condition, having been moved thereto by plug 28 of plug connector 12.

Figure 6:
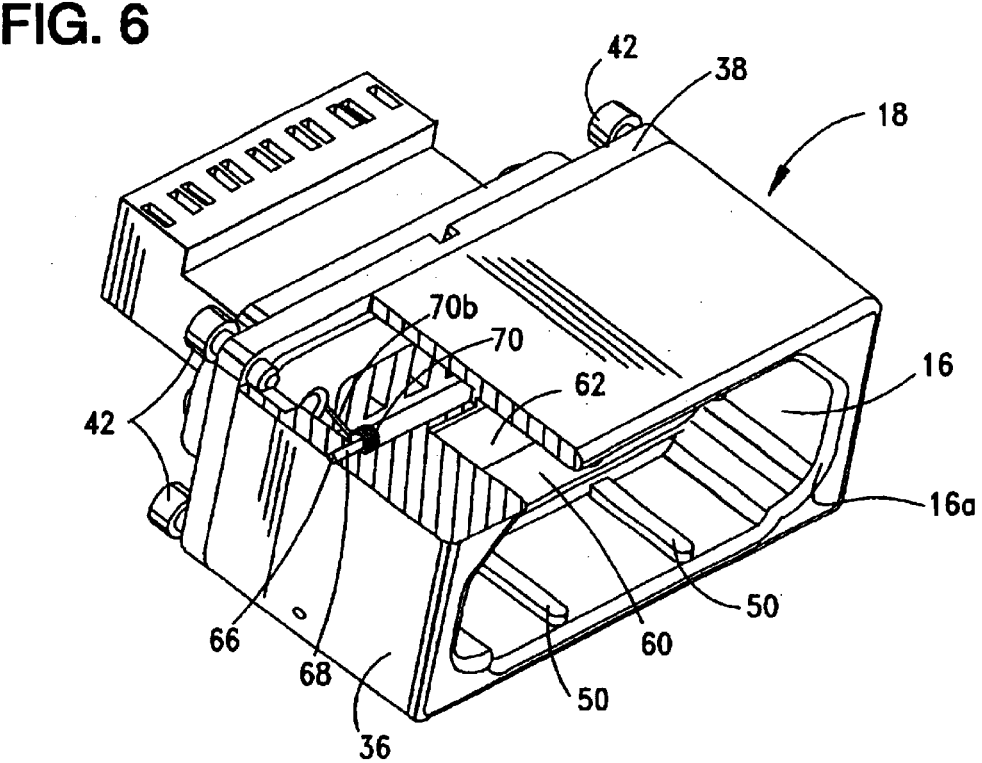
FIG. 6 is an enlarged perspective view of the adapter assembly, partially cut-away to show the pivotal mounting and one of the springs for one of the shutter members.

FIG. 6 shows that each shutter member 60 and 62 includes a pivot shaft 68 at each opposite end thereof. The pivot shaft is journalled in opposite minor side walls of front housing part 36 of adapter assembly 18. A torsion spring 70 is wrapped around the pivot shaft at each opposite end of each shutter member. As seen in FIG. 5, each torsion spring has one end 70a abutting the back side of one of the shutter members and an opposite end 70b abutting an inside wall of front housing part 36 of the adapter assembly. The torsion springs, thereby, bias the shutter members to their closed positions shown in FIG. 5. The torsion springs are fabricated to have equal spring constants to apply generally equal forces to each opposite end of each shutter member.

The invention contemplates a unique arrangement to prevent binding of shutter members 60 and 62 when they move to their closed position shown in FIGS. 5 and 7. Specifically, shutter member 60 is shorter than shutter member 62. Therefore, the shorter shutter member 60 will close before the longer shutter member 62 because of the smaller length and smaller turning or pivoting radius. The shutter members are generally rectangular as best seen in FIG. 7, and the free edge of the longer shutter member overlaps the free edge of the shorter shutter member as seen in FIG. 5, when the shutter members are closed.

FIG. 8 represents a situation when an operator may attempt to insert plug 28 of plug connector 12 into receptacle 16 of adapter assembly 18 at an angle or skewed orientation which could cause problems if alignment pins 30 could engage mating face 44 at the bottom of receptacle 16 before the alignment pins are aligned with a pair of pin-receiving guide holes 72 in the mating face of rear housing part 38 of the adapter assembly. Distal ends 32a of jack screws 32 are threaded into internally threaded holes 74, but the projecting ends of the jack screws are shorter than the projecting ends of the alignment pins, so the jack screws would not create any problems. If alignment pins 30 were able to engage mating facing 44 before the pins are aligned with guide holes 72, the alignment pins could damage ferrules 48 of terminal modules 40, along with the ends of the optical fibers which are terminated by the ferrules. The alignment pins also could damage any one of a plurality of smaller guide pins 76 which project from the ferrules.

In order to ensure that alignment pins 30 are aligned with guide holes 72 (FIG. 8), a redundant dimensional system is provided between plug connector 12 and adapter assembly 18, particularly front housing part 36 of the adapter assembly which defines receptacle 16. First of all, guide ribs 50 within receptacle 16 and guide grooves 34 on plug connector 12 have a sufficiently close fit and are of sufficient lengths to prevent alignment pins 30 from engaging mating face 44 at the bottom of receptacle 16 before the alignment pins are aligned with guide holes 72. Specifically, as stated above, guide grooves 34 are 12.5 mm long and 3.0 mm wide. Guide ribs 50 are 2.0 mm wide so that a close fit is provided between the guide ribs and the guide grooves. The ribs have lengths of approximately the same lengths as the guide grooves so that the ribs bottom-out in the guide grooves as seen in FIG. 3. Therefore, with this close fit, plug 28 of plug connector 12 cannot be inserted into receptacle 16 at a sufficiently severe angle as shown in FIG. 8, because the tips of guide ribs 50 must enter guide grooves 34 and, with the close fit between the ribs and the grooves along with the lengths of the ribs and grooves, this interfitting relationship will cause plug connector 12 to "straighten-out" on insertion into receptacle 16. As a result, the straightened plug connector will cause alignment pins 30 to be aligned with and enter guide holes 72 without-engaging mating face 44 or damaging ferrules 48 and the terminated optical fibers.

A redundant dimensional relationship exists between plug 28 and alignment pins 30, along with receptacle 16, to also prevent plug connector 12 from being inserted into receptacle 16 at a severe angle, i.e., without straightening the plug connector so that the alignment pins are aligned with guide holes 72. Specifically, double-headed arrow 80 in FIG. 3 represents the major or "X" dimension of receptacle 16 and double-headed arrow 82 in FIG. 4 represents the minor or "Y" dimension of receptacle 16. In the illustrated embodiment, the major or "X" dimension 80 is 46.6 mm, whereas the "Y" or minor dimension 82 is 20.75 mm. Still referring to FIGS. 3 and 4, double-headed arrow 84 represents the "X" or major dimension of plug 28 and is 46.0 mm. Double-headed arrow 86 in FIG. 4 represents the "Y" or minor dimension of plug 28 and is 20.0 mm. Therefore, it can be seen that the dimensions (46.0 mm×20.0 mm) of plug 28 establishes a close fit within receptacle 16 which has very slightly larger dimensions (46.5 mm×20.75 mm).

In addition, receptacle 16 has a depth as represented by double-headed arrow 88 in FIG. 5 in relation to the combined length of plug 28 and the projecting alignment pins 30, as indicated by double-headed arrow 90 in FIG. 8, to prevent the alignment pins from engaging mating face 44 within the receptacle. Specifically, the depth of receptacle 16 in a "Z" direction as represented by double-headed arrow 88 in FIG. 5, is on the order of 25.75 mm. The combined length of plug 28 and projecting alignment pins 30 in the "Z" direction as indicated by double-headed arrow 90 in FIG. 8, is on the order of 25.85 mm. Therefore, with the sufficiently close fit between plug 28 and receptacle 16 as described above, along with receptacle 16 being of a sufficient depth in relation to the length of plug 28 and the projecting alignment pins 30, the alignment pins are prevented from engaging mating face 44 at the bottom of the receptacle before the pins are aligned with guide holes 72 in mating face 44. This positional relationship is a redundant dimensional relationship in addition to that of guide ribs 50 and guide grooves 34, to ensure that the alignment pins do not ever engage mating face 44 of ferrules 48 during mating of plug connector 12 and adapter assembly 18.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A receptacle for receiving a fiber optic connector along an optic axis, comprising:
   a housing having an open end for receiving the fiber optic connector inserted thereinto on said optic axis; and
   a pair of shutter members pivotally mounted on the housing at opposite sides of the open end for pivotal movement toward and away from each other toward and away from the optic axis to close and open said open end, one of the shutter members being shorter than the other shutter member in a direction radially of said axis so that the one shutter member closes before the other shutter member and, thereby, prevents binding therebetween.

2. The receptacle of claim 1 wherein an inner edge of said other shutter member overlaps an inner edge of said one shutter member when the shutter members are closed.

3. The receptacle of claim 1 wherein said shutter members are generally planar.

4. The receptacle of claim 3 wherein said open end of the housing is generally rectangular, and said shutter members are generally rectangular.

5. The receptacle of claim 1, including spring means operatively associated between the shutter members and the housing to bias the shutter members toward closed positions.

6. The receptacle of claim 5 wherein said spring means include at least one spring member for each shutter member with generally equal spring constants to apply a generally equal spring force on each shutter member.

7. A receptacle for receiving a fiber optic connector along an optic axis, comprising:

a housing having a generally rectangular open end for receiving the fiber optic connector inserted thereinto on said optic axis;

a pair of planar, generally rectangular shutter members pivotally-mounted on the housing at opposite sides of the open end for pivotal movement toward and away from each other toward and away from the optic axis to close and open said open end, one of the shutter members being shorter than the other shutter member in a direction radially of said axis so that the one shutter member closes before the other shutter member and, thereby, prevents binding therebetween, with an inner edge of said other shutter member overlapping an inner edge of said one shutter member when the shutter members are closed; and spring means operatively associated between the shutter members and the housing to bias the shutter members toward closed positions.

8. The receptacle of claim 7 wherein said spring means include at least one spring member for each shutter member with generally equal spring constants to apply a generally equal spring force on each shutter member.

* * * * *